(12) United States Patent
Maheshwari

(10) Patent No.: US 11,403,719 B2
(45) Date of Patent: *Aug. 2, 2022

(54) PREEMPTIVE DATA PROCESSING TO MITIGATE AGAINST OVERDRAFT AND DECLINED TRANSACTION

(71) Applicant: PayPal, Inc., San Jose, CA (US)

(72) Inventor: Vishal Maheshwari, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,457

(22) Filed: May 17, 2021

(65) Prior Publication Data

US 2021/0279819 A1    Sep. 9, 2021

Related U.S. Application Data

(63) Continuation of application No. 16/675,075, filed on Nov. 5, 2019, now Pat. No. 11,010,844, which is a continuation of application No. 15/253,700, filed on Aug. 31, 2016, now Pat. No. 10,467,709.

(51) Int. Cl.
   *G06Q 40/00*    (2012.01)
   *G06Q 50/00*    (2012.01)
   *G06Q 20/32*    (2012.01)

(52) U.S. Cl.
   CPC ......... *G06Q 50/01* (2013.01); *G06Q 20/3224* (2013.01)

(58) Field of Classification Search
   CPC ........ G06Q 20/10; G06Q 20/40; G06Q 40/02; G06Q 40/00; G06Q 20/20; G06Q 30/0601; G06Q 20/12; G06Q 30/0641; G06Q 40/04; G06Q 20/405; G06Q 20/108
   USPC .......................................... 235/375, 379, 380
   See application file for complete search history.

(56) References Cited

U.S. PATENT DOCUMENTS

| | | | |
|---|---|---|---|
| 7,617,156 B1 | 11/2009 | Wolfson | |
| 8,606,714 B1 | 12/2013 | Cameo et al. | |
| 2007/0106558 A1 | 5/2007 | Mitchell et al. | |
| 2007/0262137 A1 | 11/2007 | Brown | |
| 2011/0295731 A1 | 12/2011 | Waldron, III et al. | |
| 2012/0265681 A1 | 10/2012 | Ross | |
| 2013/0173468 A1 | 7/2013 | Ross | |

*Primary Examiner* — Jamara A Franklin
(74) *Attorney, Agent, or Firm* — Haynes and Boone, LLP

(57) ABSTRACT

A system or method may implement an overdraft prediction analysis to predict whether an account overdraft is about to occur. The overdraft prediction analysis may be based on: 1. customer account data, such as current account balance, historical balances, historical withdrawals, historical deposits balance trends, and the like; 2. account transaction data, such as routine or recurring account transactions, timing of transactions, amount, deposit or withdrawal transactions, and the like; 3. location data, such as locations of past purchases or payments; and 4. time and date data, such as dates and times of past transactions. Other factors, such as credit score, loan activities, social data, or the like also may be used for the overdraft prediction analysis. Once an overdraft situation is predicted, the system or method may provide options for the users to avoid or mitigate the potential account overdraft.

20 Claims, 5 Drawing Sheets

PREEMPTIVE DATA PROCESSING TO MITIGATE AGAINST OVERDRAFT AND DECLINED TRANSACTION

CROSS-REFERENCE TO RELATED APPLICATIONS

The present application is a continuation of U.S. patent application Ser. No. 16/675,075, filed Nov. 5, 2019, which claims priority to U.S. patent application Ser. No. 15/253,700, filed Aug. 31, 2016, now U.S. Pat. No. 10,467,709, issued on Nov. 5, 2019, the disclosures of which are expressly incorporated herein by reference in their entireties.

BACKGROUND

Technical Field

The present invention generally relates to data processing, and in particular, to data processing that enables a user to more effectively manage an electronic transaction through a user device, such as a mobile computing device.

Related Art

With the proliferation of computers and mobile computing devices, electronic data processing has evolved, such that previously unheard of transactions can now be processed and content delivered virtually anywhere and at any time. One type of transaction is electronic purchasing or fund transfers, such as through a smart phone. When such a transaction is made, typically a processor is required to determine availability of funds from a sender, pull funds from an account of the sender, and credit an account of a recipient. However, when the sender has insufficient funds, an account overdraft situation may occur. Users prefer to avoid account overdrafts, because banks typically charge penalty fees when account overdrafts occur, and/or the transaction may be denied. However, with various withdrawals from and deposits into the account from multiple channels such as mobile, web, and/or ATM's, an account balance may change frequently. As such, it becomes difficult for account users to keep track of their account balances to prevent account overdrafts. Further, processing the transaction when overdrafts occur also has adverse effects for the processing entity, such as requiring additional processing to ultimately complete the transaction (e.g., through processing of overdraft fees or declining and then later approving the transaction when sufficient funds are available). Therefore, there is a need for a system or method that provides account overdraft prediction, prevention, and mitigation functionality.

Figure 1:
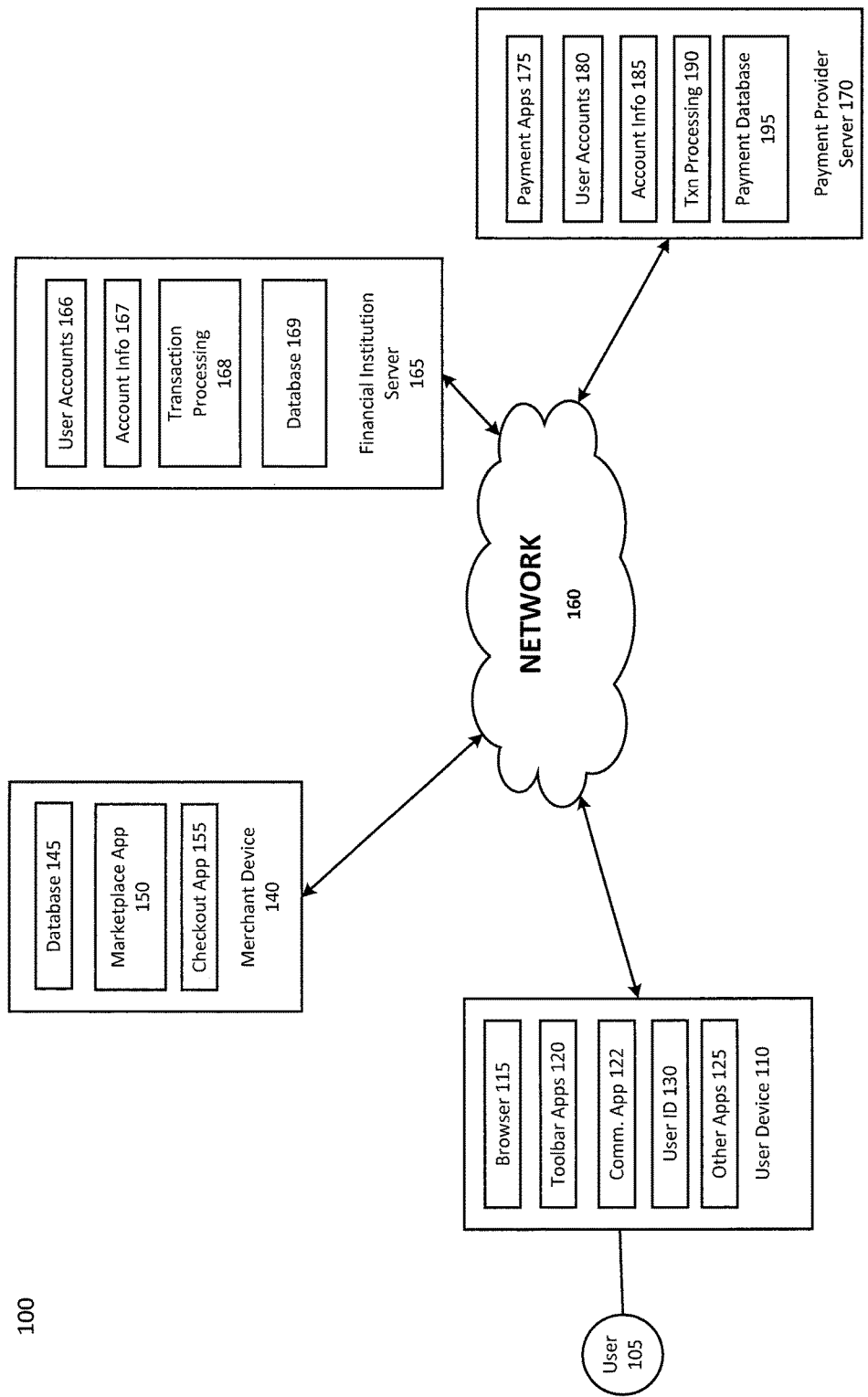
FIG. 1 is a block diagram of a networked system suitable for implementing account overdraft prevention functions according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a computing device, such as a mobile device, is provided with account overdraft prevention functions for preventing or mitigating user account overdrafts. In particular, a system or method may implement an overdraft prediction analysis to predict whether an account overdraft is about to occur. The overdraft prediction analysis may be based on: 1. customer account data, such as current account balance, historical balances, historical withdrawals, historical deposits, and the like; 2. account transaction data, such as routine or recurring account transactions, timing of transactions, amount, subscription related and the like; 3. location data, such as locations of past purchases or payments; and 4. time and date data, such as dates and times of past transactions, time spent at different locations. Other factors, such as credit score, loan activities, or the like also may be used for the overdraft prediction analysis.

In an embodiment, once an overdraft situation is predicted, the system or method may provide options for the users to avoid or mitigate the potential account overdraft. In an embodiment, the system may send a notification to the mobile device of the user when a potential account overdraft is detected. Upon the user's request, the system may provide additional information regarding the potential overdraft on the user's mobile device. The additional information may include one or more upcoming transactions that may cause the potential overdraft, as well as suggestions or options the user can select to mitigate or avoid the overdraft.

In an embodiment, the system may allow the user to apply for credit or a loan to prevent the account overdraft. For example, the system may analyze the user's risk profile based on past account and transaction history and automatically provide a credit line or loan to the user with any applicable cost or fees. In some embodiments, the loan may automatically be returned to the lender if the loan is not used or after the account becomes solvent again.

In another embodiment, the system may allow the user to transfer funds from one or more of the user's other accounts, such as other personal or business accounts, to avoid the account overdraft. In some embodiments, the system may allow the user to make mobile electronic deposits, such as taking a picture of a check or physical currency, to fund the account to avoid account overdraft. The system also may provide an option for the user to borrow from friends or family, such as other users on the user's social media web site or contact list. Funds from other users may be processed and deposited into the user's account in real time to avoid account overdraft.

In an embodiment, the system may provide options for the user to modify one or more upcoming transactions or scheduled payments to avoid account overdraft. For example, the system may allow the user to cancel or delay certain upcoming payments or transactions to avoid account overdraft for both the current transaction and the upcoming transaction(s). In another example, the system may allow the user to change certain terms, conditions, or arrangements of the transaction, such as changing the payment terms, delivery arrangement, or the like, to avoid account overdraft.

In some embodiments, the system may allow the user to restrict further potential spending to avoid account overdraft. For example, when the system detects that the user is at a shopping location, the system may notify the user that a possible account overdraft may occur based on the user's spending history at the shopping location. The system may provide options for the user to restrict spending at the shopping location to be within a certain amount to avoid account overdraft.

Thus, by preventing or mitigating overdraft, processing time and power can be improved because additional processing to process overdraft fees and/or cancel a transaction and then handle a new transaction for the same item or service is avoided.

FIG. 1 is a block diagram of a networked system 100 suitable for implementing mobile devices with account overdraft prevention functions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, a financial institution server 165, and a payment provider server 170 in communication over a network 160. Payment provider server 170 may be maintained by a payment service provider, such as PayPal, Inc. of San Jose, Calif. The financial institution server 165 may be maintained by a financial institution, such as a bank, a credit card company, or the like. A user 105, such as a sender or consumer, utilizes user device 110, e.g., a mobile device, to perform a transaction using payment provider server 170. User 105 may utilize user device 110 to initiate a payment transaction, receive a transaction approval request, or reply to the request. The financial institution, such as a bank or a credit card company, may be used as a funding source or a deposit account for the transaction. Note that transaction, as used herein, refers to any suitable action performed using the user device, including payments, transfer of information, display of information, etc. Although only one merchant server is shown, a plurality of merchant servers may be utilized if the user is purchasing products or services from multiple merchants.

In some embodiments, user device 110 may download a mobile app from payment provider server 170 or servers of online service providers. The mobile app may provide account management functions and account overdraft prevention functions to the user 105 through user device 110. User device 110 may include location detection devices, such as a Global Positioning System (GPS) sensor and/or a Bluetooth device configured to implement low energy Bluetooth communication. As such, user device 110 may detect a location of the user 105 and/or an indoor location of the user 105 by interacting with a network of low energy Bluetooth beacons installed at an indoor location. Thus, the indoor and outdoor location and movements of user device 110 may be detected. The location and movement of user 105 and/or other users may be used to determine and/or predict potential account overdrafts.

User device 110, merchant server 140, financial institution server 165, and payment provider server 170 may each include one or more processors, memories, and other appropriate components for executing instructions such as program code and/or data stored on one or more computer readable mediums or cloud servers to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks. In some embodiments, the network 160 may include payment networks, such as credit/debit rails including various financial entities for processing credit/debit transactions.

User device 110 may be implemented using any appropriate hardware and software configured for wired and/or wireless communication over network 160. For example, in one embodiment, user device 110 may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for setting up a shopping list and/or merchant sites for viewing and purchasing products and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 or mobile apps as may be desired in particular embodiments to provide desired features to user device 110. For example, other applications 125 may include security applications for implementing client-side security features, programmatic client applications for interfacing with appropriate application programming interfaces (APIs) over network 160, or other types of applications.

Applications 125 may also include email, texting, voice and IM applications that allow user 105 to send and receive emails, calls, and texts through network 160, as well as applications that enable the user to communicate, transfer information, make payments, and otherwise communicate and receive information for account overdraft prevention functions as discussed herein. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include a Bluetooth device configured to implement low energy Bluetooth (BLE) communication. For example, user device 110 may detect various low energy Bluetooth signals from Bluetooth beacons installed in a merchant's store or at various public venues. Thus, locations and movements of user device 110 may be determined by positioning techniques, such as triangulation or location fingerprinting. User device 110 also may include other location sensors, such as Global Positioning System (GPS), or movement sensors, such as gyroscope and/or accelerometer, that are configured to detect location and movement.

Merchant server 140 may be maintained, for example, by a merchant or seller offering various products and/or services or by an operator of a public venue. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as banks and retailers, or provides services and/or items to a user.

Merchant server 140 may include a database 145 identifying available products (including digital goods) and/or services (e.g., collectively referred to as items) which may be made available for viewing and purchase by user 105. Accordingly, merchant server 140 also may include a marketplace application 150 which may be configured to serve information over network 160 to browser 115 on user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment provider and receive information from the payment provider (e.g., a transaction ID, transaction status, fees etc.). Checkout application 155 may be configured to receive payment via a plurality of payment methods including cash, credit cards, debit cards, checks, money orders, or the like.

Payment provider server 170 may be maintained, for example, by an online payment service provider which may provide services between user 105, financial institutions, and the operator of merchant server 140. In this regard, payment provider server 170 includes one or more payment applications 175 which may be configured to interact with user device 110 and/or merchant server 140 over network 160 to facilitate the purchase of goods or services, communicate/display information, and send payments from or receive payments by user 105 of user device 110.

Payment provider server 170 also maintains a plurality of user accounts 180, each of which may include account information 185 associated with consumers, merchants, and funding sources, such as banks or credit card companies. For example, account information 185 may include private financial information of users of devices such as account numbers, passwords, device identifiers, user names, phone numbers, credit card information, bank information, or other financial information which may be used to facilitate online transactions by user 105. Account information also may include rules and terms regarding account overdraft, such as penalty fees when account overdraft occurs, and the like. Payment provider server 170 may obtain user permission to retrieve and monitor account balance of various funding source bank accounts to prevent account overdraft. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from user device 110 and/or merchant server 140 for processing and storage in a payment database 195. Transaction processing application 190 may include one or more applications to process information from user 105 for processing an order and payment and/or implementing overdraft prevention or mitigation as described herein. As such, transaction processing application 190 may store details of an order from individual users, including funding source used, credit options available, etc. Payment application 175 may be further configured to determine the existence of and to manage accounts for user 105, as well as create new accounts if necessary. Payment provider server 170 also may store social network/media information of the user 105, such as the user 105's various social network/media accounts, social network/media activities, and the like.

The financial institution server 165 may be maintained, for example, by a bank or a financial institution offering fund transaction services. The bank may have a physical point-of-sale (POS) store front. The bank may be a participating member of NACHA. The financial transaction server 165 may be used for POS or online purchases and transactions. Generally, the financial institution server 165 may be maintained by anyone or any entity that performs fund transfers. The financial institution server 165 may include user accounts 166 associated with users registered to conduct financial service at the financial institution. The users may include individuals, companies, organizations, merchants, and etc. Each of user accounts 166 may include account information 167 associated with each account user. Account information 167 may include private financial information of each account user, such as account numbers, passwords, user names, phone numbers, or other financial information which may be used to facilitate financial transactions by a user.

The financial institution server 165 also may include a transaction processing unit 168 configured to process fund transfers. In particular, transaction processing unit 168 may send funds from a user's account to another account within or outside the financial institution. For example, transaction processing unit 168 may generate an ACH file including transaction entries instructing specific funding transfers and send the ACH file to an ACH server to process fund transfer. Further, transaction processing unit 168 also may receive an ACH file from the ACH server and may process transaction entries in the received ACH file and deposit funds to designated accounts. The financial institution server 165 may have a database 169 configured to store previous fund transactions. In particular, records of fund transactions may be stored at database 169 for record keeping purposes.

Figure 2:
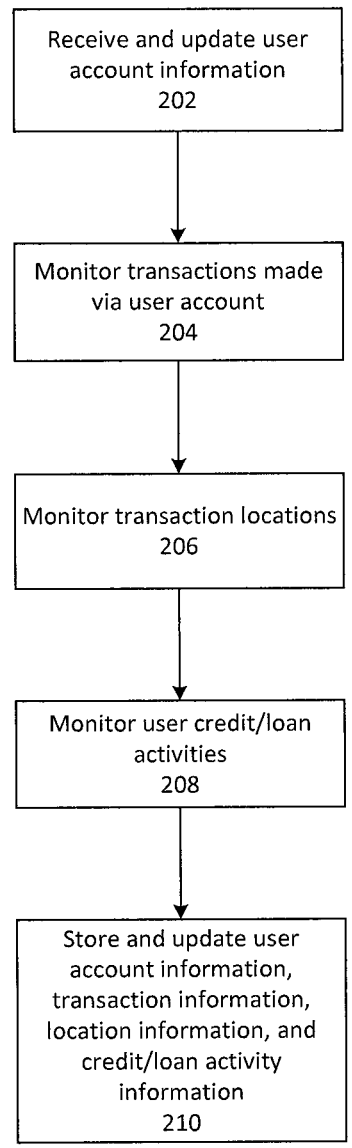
FIG. 2 is a flowchart showing a process for setting up account overdraft prevention functions according to one embodiment.

FIG. 2 is a flowchart showing a process 200 for setting up account overdraft prevention functions according to one embodiment. At step 202, user device 110 or payment provider server 170 may receive user account information. For example, the user 105 may provide account information, such as bank name, bank routing number, account number, credit card number, debit card number, user name, user ID, password, access code, and the like to the payment provider server 170. The user 105 may provide multiple bank accounts, credit card accounts, and/or other funding sources to be associated with a payment account of the user 105. The user 105 may grant permission for the payment provider server 170 to retrieve or access account information from the financial institutions where the user 105 has established accounts. For example, the payment provider server 170 may retrieve account information from various banks or financial institutions via API servers of the financial institutions, such as the financial institution server 165, or through a third party which has integrated with bank or financial institutions. The account information may include account terms and conditions, such as terms and conditions related to rules and fees for account overdraft.

At step 204, the payment provider server 170 may monitor transactions made via the user account. For example, the payment provider server 170 may retrieve account activities and account transactions, such as payments, withdrawals, deposits, and the like, from banks or financial institutions periodically, such as every minute, every hour, or every day. Thus, the payment provider server 170 may keep track of and monitor various account transactions and changes in account balance in real time in order to detect potential account overdraft in real time.

In some embodiments, the user 105 may have a payment account with the payment service provider and the payment account may designate several funding sources, such as bank accounts, credit cards, and the like, for making or receiving payments. The payment provider server 170 may monitor multiple funding source accounts associated with the user 105's payment account to make sure no account overdraft occurs in the multiple funding source accounts. Monitoring available funds also enables the system to determine how much is available to move to a currently used account in a potential overdraft situation.

At step 206, the payment provider server 170 may monitor user location information. For example, the location of the user 105 may be detected by location detection devices installed on the user device 110. As such, location, time, date of various transactions conducted by the user 105 may be detected and stored. The location information may include geographical location and online presence, such as which website or online merchant the user 105 has visited or made purchases from, IP address, merchant domain. The location information also may include locations of the user 105 at different indoor locations of merchants, including when and how much time the user 105 spent at different physical or online locations and the transactions made associated with the different locations.

At step 208, the payment provider server 170 may monitor user credit/loan activities related to the user 105's accounts. Thus, information regarding credit activities, such as credit or loan applications, may be retrieved and monitored from banks or other financial institutions. In some embodiments, the payment provider server 170 may obtain credit information from credit reporting agencies, such as EQUIFAX, EXPERIAN, or TRANS UNION. In some embodiments, the payment provider server 170 may access and obtain the user 105's social network/media activities, such as online postings, blogging, and other online social media/networking activities.

At step 210, the payment provider server 170 may store and update user account information, transaction information, location information, and credit/loan information. The payment provider server 170 may store and analyze the various data for predicting potential account overdraft. For example, based on historical account balance information, the payment provider server 170 may determine account balance trends, seasonal trends, and the like, such as when the account balance are typically the lowest, e.g., end of month or during holiday seasons. In another example, based on historical transaction information, the payment provider server 170 may determine routine transactions or recurring transactions, such as monthly payments, bill pay or subscriptions, and the like. The payment provider server 170 may determine transaction patterns and trends versus time, season, and/or location, such as which season has more spending or where the user 105 spends money and during which days (e.g., Saturdays, after a paycheck deposit or other deposit, anniversary, birthday, Valentine's Day, etc.) that may specific to the user or more generally to the public or grouping of the user (e.g., millennial, senior citizen, college student, etc.). Other data can also be used, such as from user postings on social networks, indicating an upcoming use of funds, such as attendance/travel to an event, or unexpected decrease or increase of funds, such as a loss of a job, getting a new job, upcoming birth of a child, winning a lottery, adoption of a pet, etc. Accordingly, process 200 may be used to gather information for predicting and avoiding account overdraft based on account information, transaction information, location information, user calendar information, online social media/networking information, and/or credit/loan activity information.

Figure 3:
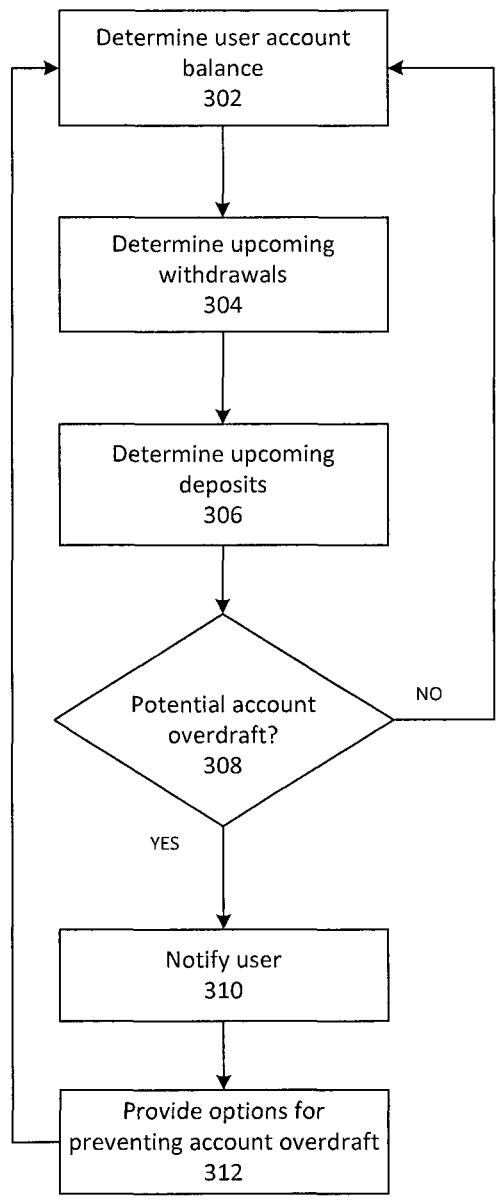
FIG. 3 is a flowchart showing an account overdraft prevention process according to one embodiment.

FIG. 3 is a flowchart showing a process 300 for implementing account overdraft prevention functions according to one embodiment. At step 302, the payment provider server 170 may determine account balance 302. For example, the payment provider server 170 may retrieve account balances from bank servers or servers of other financial institutions, such as the financial institution server 165, via API. The payment provider server 170 may retrieve account balances of multiple funding sources, e.g., bank accounts/credit card accounts, associated with the user 105's payment account. The payment provider server 170 may retrieve account balance information periodically, such as every minute, every hour or every day, to obtain real time account balance.

In some embodiments, when the account balance information is not available, such as due to the payment provider server 170 not able to reach or access a bank server, the payment provider server 170 may estimate the account balance based on account balance information last received, the historical account balance information, and transactions made since the last known account balance. Based on the time of the month, the month of the year, or the location of the user, the payment provider server 170 may determine an estimated account balance based on historical data. For example, to estimate the account balance in the middle of May, the payment provider may take an average of the account balances in the middle of the May of last three years, assuming the account balance has a relative consistent trend in the middle of May for the last three years. In some embodiments, the estimated account balance may be adjusted by recent withdrawal trends or deposit trends, such as based on cash flow of last two weeks.

At step 304, the payment provider server 170 may determine upcoming potential withdrawals from the account, such as payments, bill pay, or expenses. The potential withdrawals may be scheduled by the user 105. In some embodiments, the payment provider server 170 may determine potential withdrawals based on transaction history and trends, routine or recurring payments, such as monthly loan payments or utility payments. Potential withdrawals also may be based on seasonal trends or monthly trends. For example, based on historical transaction data, withdrawals may increase near the end of the month or near the end of the year. In another example, more withdrawals may be initiated in the beginning of a day compared to the end of a day.

In an embodiment, the upcoming potential withdrawals may be determined based on the user 105's current location and the user 105's transaction history and location history. In particular, the location history of "hot-spots" where the user 105 made transactions may be tagged. For example, the user 105 may frequently spend money at a shopping location. The system may record the time, location, merchant, and the amount of money spent at the shopping location. This historical data may be used to predict that the user 105 is likely to spend a certain amount of money when the user 105 visits the shopping location again, depending on the time of the day, the day of the month and/or the month of the year. The shopping location may be a physical store of a merchant or an online shopping website. For example, the user 105 may have spent an average of $120 the last three times the user visited the shopping location. As such, the system may estimate that the user is likely to spend about $120 when the user visits the shopping center this time.

In some embodiments, the estimated spending amount may be adjusted further based on the user 105's calendar, to-do list, social media posting, and the like, such as indications that the user 105 is shopping for an upcoming birthday gift or planning for a party. In some embodiments, the system may determine upcoming potential withdrawals based on the user 105's electronic communication, such as text messages or emails with friends or online social media postings. For example, the system may determine based on an electronic conversation with a friend that the user 105 is about to make a peer-to-peer payment to the friend.

The system may determine upcoming potential account withdrawals based on one or a combination of different factors, as discussed above. The system may determine upcoming potential account withdrawals that are likely to occur in the next several minutes, several hours, or the next few days, such that the system or the user 105 may have adequate time to take actions to avoid account overdraft.

At step 306, the system may determine upcoming account deposits. The upcoming deposits may be scheduled by the user 105, such as deposits from another account of the user 105. In some embodiments, the payment provider server 170 may determine upcoming potential deposits based on transaction history and trends, routine or recurring deposits, such as monthly salary or rent checks from rental properties. Potential deposits also may be determined based on seasonal trends or monthly trends, such as a year-end work bonus or income tax refund. For example, based on historical transaction data, deposits may increase near the middle and the end of the month (e.g., pay day) or near the end of the year (e.g., year-end bonus). In another example, more deposits may be initiated in the beginning of a day compared to the end of a day.

In an embodiment, the upcoming potential deposits may be determined based on the user 105's current location and the user 105's transaction history and location history. In particular, the location history of hot-spots where the user 105 made deposit transactions may be tagged. For example, the user 105 may frequently make deposits at a certain ATM or a certain bank location. The system may record the time, location, financial institution, and the amount of money deposited at ATM or bank locations. This historical data may be used to predict that the user 105 is likely to make a deposit of a certain amount when the user 105 visits an ATM or a bank location again, depending on the time of the day, the day of the month and/or the month of the year, such as at times the user receives cash or checks for a job nearby. The user 105 may deposit an average of $500 the last three times the user 105 visited an ATM. As such, the system may estimate that the user is likely to deposit about $500 when the user visits the ATM this time. In some embodiments, the estimated deposit amount may be adjusted further based on the user 105's calendar, to-do list, social media posting, and the like, such as indications that the user 105 just received money as a birthday gift.

The user 105 may use the user device 110 to make deposits by taking a picture of a check or paper money. The picture of the check may be submitted to a bank or the payment service provider via a mobile app on the user device 110. The location, time, and date where the user 105 makes the mobile deposit may be recorded and used as historical data to determine potential upcoming deposits. For example, the user 105 may frequently make mobile deposits using the user device 110 at the user 105's work place on Fridays after the user 105 gets paid. Thus, the system may determine a potential mobile deposit when the user 105 is again at the workplace on a Friday.

In some embodiments, the system may monitor credit/loan activity related to the user 105's account and may determine upcoming deposits based on the user 105's credit/loan activities. For example, the system may determine, based on the user 105's credit/loan activity that the user 105 is applying for a credit line or a loan and may be expecting a deposit from the credit/loan application at a certain date. In some embodiments, the system may determine potential upcoming deposits based on the user 105's electronic communication, such as text messages, or emails with other users or online social media postings. For example, based on the user 105's communication with another user, the system may determine that the user 105 is about to receive a payment from another user. The system may determine upcoming potential account deposits based on one or a combination of different factors, as discussed above. The system may determine upcoming potential account deposits that are likely to occur in the next several hours or the next few days, such that the system or the user 105 may have adequate time to consider the upcoming potential deposits for preventing account overdraft.

At step 308, the system may determine whether there is a potential account overdraft. The system may determine a potential account overdraft based on the user account balance determined in step 302, the potential upcoming withdrawals determined in step 304, and the potential upcoming deposits in step 306. For example, the system may determine, at any time in the next several hours or next few days, whether the account balance will become negative, based on the formula: account balance−withdrawals+deposits and based on the chronological order of the transaction posting to the account.

The system may detect potential account overdrafts by performing a simulation of changes in account balance based on the different timings and occurrences withdrawals and deposits. For example, with a starting account balance of $100, the account may first receive a deposit of $200 and then has a withdrawal of $250 for the next several days. In this scenario, the account will not encounter an account overdraft. However, if the account has the withdrawal of $250, before the deposit of $200, an account overdraft may occur. As such, the various upcoming potential transactions may be applied to the account balance in a chronological manner to detect potential account overdrafts. The user 105 may adjust how far ahead in the future the user 105 wants the system to look into for potential account overdrafts. For example, the user 105 may instruct the system to continuously look into the upcoming four hours or the upcoming two days for potential account overdrafts.

If no account overdraft is detected at step 308, the process may return to step 302 where the system may continue to determine and update account balance and determine upcoming potential withdrawals and deposits. If one or more account overdrafts are detected at step 308, the system may notify user at step 310. For example, the system may communicate a notification to the user 105 via a mobile app executing at the user device 110. If the mobile app is currently not running, the system may communicate the notification via text messaging, email, or by telephone communication.

Figure 5C:
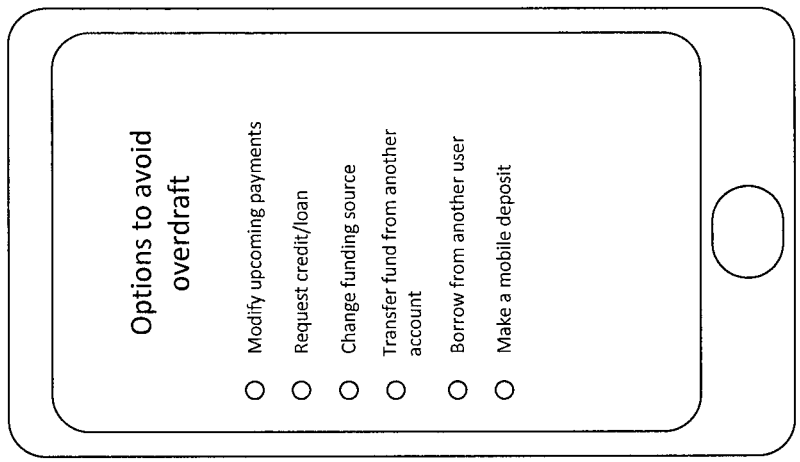
FIGS. 5A-5C are diagrams depicting mobile device screen shots of account overdraft prevention functions according to one embodiment.
Figure 5B:
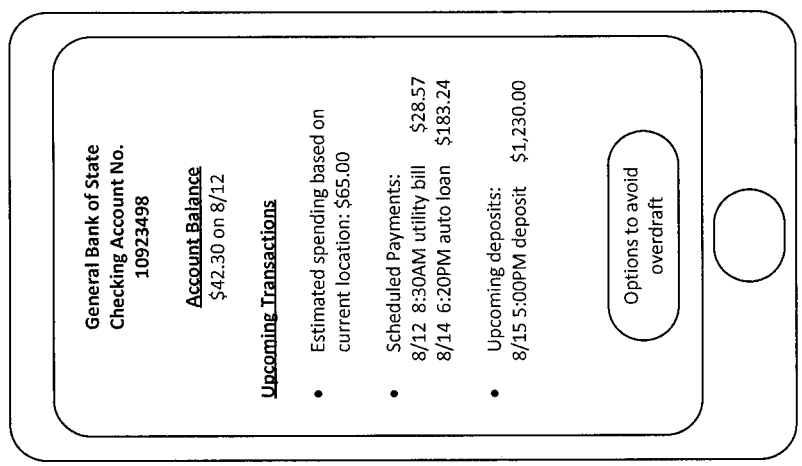
Figure 5A:
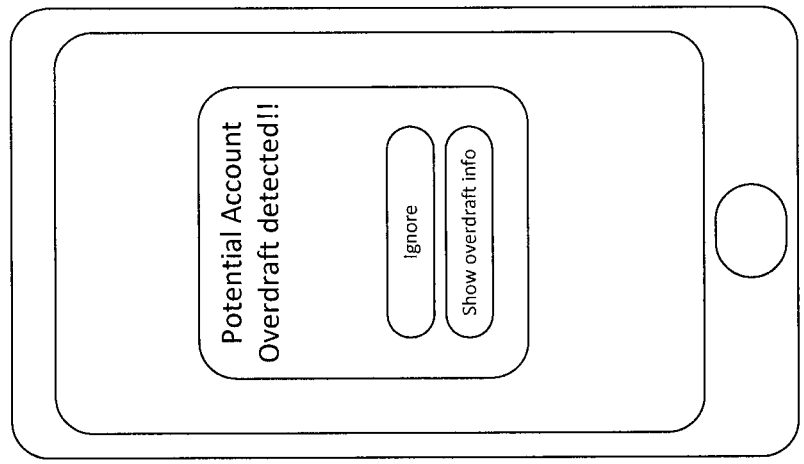

As shown in FIG. 5A, a pop-up notification window may be displayed on the user device 110 to notify the user. The notification may indicate that a potential account overdraft is detected, either for a possible current transaction or a future predicted transaction. The notification may also provide options for the user to view overdraft information or ignore the notification. Other means of notification, such as by an audio alert, vibration, or other visual alert also may be implemented or included with the notification. If the user 105 chooses to ignore the notification, such as by clicking on or selecting the "ignore" button, the notification may disappear from the display. If the user 105 chooses to review information regarding the detected overdraft, such as by clicking on or selecting the "show overdraft info" button, the system may provide detailed information regarding the detected account overdraft to the user 105, as shown in FIG. 5B.

The details of the account overdraft information may include the name of the financial institution, the type of account, the account number, the current account balance, as determined in step 302 and the upcoming withdrawals or deposits, as determined in steps 304 and 306. For example, as shown in FIG. 5B, the current account balance is $42.30 and the upcoming transactions include an estimated spending based on the user 105's current location of $65, scheduled utility bill payment of $28.57 on August 12 at 8:30 AM, auto loan payment of $183.24 on August 14 at 6:20 PM, and an upcoming deposit of $1,230 on August 15 at 5:00 PM. The transaction that could cause the account overdraft may be displayed in a particular color or may be highlighted by bold or underline. In this case, the estimated spending of $65 at the current location may cause account overdraft because the spending of $65 is greater than the current account balance of $42.30.

At step 312, the system may provide options for the user 105 to avoid the account overdraft. As shown in FIG. 5B, a button "options to avoid overdraft" may be provided with the overdraft information and the user 105 may click on or select the button "options to avoid overdraft" to request or show different options available for preventing the detected account overdraft. For example, in response to the user 105 selecting "options to avoid overdraft" button in FIG. 5B, the mobile app may display various options to avoid overdraft, as shown in FIG. 5C. The options may include modifying an upcoming payment, requesting for credit/loan, changing a funding source, transferring funds from another account, borrowing from others, making a mobile deposit, or the like. The user 105 may select one or more of these options to prevent account overdraft. The options may be specific to the user, such as based on internal risk assessment, external creditworthiness, expectation of future income, expectation of future loss or decreased income, amount already owed on other accounts, etc.

The system may allow the user 105 to avoid account overdraft by modifying upcoming withdrawals. For example, the system may show the user 105 upcoming withdrawals that may cause account overdraft, which may be caused by the user proceeding with a current transaction or just based on available funds without any current payments, and allow the user 105 to modify the withdrawals, such as canceling or delaying the withdrawal transaction that may cause account overdraft. The system may suggest that the user 105 delay the withdrawal until after the account is replenished with a deposit. The system also may suggest that the user 105 reduce the amount of withdrawal based on the available account balance. Depending on the type of withdrawal, the user may have a certain grace period, such that a later withdrawal/payment will not incur any fees or other negative impact to the user. Even if a fee may occur, delaying the withdrawal may still be suggested if the fee is less than an overdraft fee if the user makes a current transaction. Thus, various factors may be analyzed to determine which options the user has to eliminate or reduce overdraft issues.

In some embodiments, the system may allow the user 105 to change terms and/or arrangements of a transaction to avoid account overdraft. For example, if the withdrawal is a payment for a purchase, the system may allow the user to subscribe to a pay after delivery feature or a charge on delivery (COD) option to delay the purchase payment or elect to return the purchase. In another example, the system may allow the user 105 to delay the delivery of the purchase to delay the purchase payment. In another example, the system may allow the user 105 to make an upcoming deposit earlier, such as move up the date or time of an upcoming deposit from another of the user's account. In still another example, the system may allow the user 105 to increase an amount of an upcoming deposit to avoid the account overdraft.

The system may allow the user 105 to request a line of credit or a loan to avoid the account overdraft. The payment service provider or a third party lender may offer loans or a credit line based on the user 105's risk profile, as derived from the user 105's transaction history and/or credit history with the payment service provider. For example, the payment provider server 170 may determine the user 105's risk profile based on the account balance history and transaction history of the account, such as how often the account is delinquent and/or how much money the user 105 has in the user 105's other accounts or funding sources. In an example, the payment service provider may open a credit card account in real time based on the user 105's prior credit approval and may fund the account with the credit card account. In another example, if the withdrawal is a payment to a merchant, the payment service provider may provide a merchant credit to the user and the merchant may fund the payment and will receive fees for the transaction. In still another example, the payment service provider may route the debit or withdrawal transaction to a credit rail and charge fees for a credit transaction.

The system may allow the user 105 to request a conditional line of credit or a conditional loan in which the conditional credit or loan is applied only if the account overdraft occurs. As such, if the account overdraft does not occur, no credit line or loan is used. The system may charge a fee for this service which may be cheaper than applying for a traditional loan or traditional line of credit. In this example, the system may detect that a withdrawal transaction that is about to be processed would cause account overdraft. As such, the withdrawal transaction may be put on hold or delayed and the system may first apply the conditional loan or line of credit to the account, then the system may process the withdrawal transaction on the account. Thus, the account is protected by the conditional loan/credit from the account overdraft. In another example, the conditional loan may place a conditional fund in the account ready to be used. If no overdraft occurs, the conditional fund may be returned automatically to the lender. In another scenario, only a partial portion of the conditional fund is used to cover for the account overdraft and the unused portion of the conditional fund may be returned back to the lender.

The system may allow the user 105 to borrow from other users, such as the user 105's friends or family members. For example, the system may allow the user 105 to contact others users in the user 105's contact list or social media network to request and borrow money from other users. The user 105 may use the mobile app of the payment service provider to select other users and send out borrowing requests by email or text message or post the borrowing request on a social media website. The system may generate request templates, such as "XX needs $50." The system may then process an electronic fund transfer from accounts of the friends or family members that accept or agree to the request to a funding account of the user 105.

The system may allow the user 105 to promise to pay back the personal loan after the account overdraft is avoided and the user 105's account has adequate funds to pay back the personal loan. For example, based on the user 105's account's historical data, the system may forecast when the account will be safe (e.g., no less than a certain dollar amount or percentage required to maintain the account in good standing or prevent fees incurred based on the balance) from overdraft and when the account will have adequate funds to pay back the personal loan. The system may include an expected pay back date on the borrowing request. Further, the user 105 may allow the system to automatically pay back the personal loan after the system determines that the account has no overdraft risk or the risk is less than a predetermined percentage an overdraft will occur based on various factors discussed herein and that the account has adequate funds. This automatic pay back arrangement may be indicated in the borrowing request, such that potential lenders may have more assurance of pay back and may be more willing to lend the user 105 money to avoid account overdraft.

In some embodiments, the system may allow the user 105 to obtain conditional loans from other users in which the conditional loan is applied to the user 105's account if account overdraft is about to occur. The conditional loan is not applied if no account overdraft occurs. The user 105 may obtain one or more conditional loans from other users. For example, a child's account may have conditional loans from both of the child's parents' accounts. As such, the child's account is linked to the parents' accounts and when the child's account is about to have an account overdraft, the system may automatically transfer funds from the parents' account to avoid account overdraft in the child's account. In this scenario, the system may check first to make sure the parents' accounts have adequate funds before the money is transferred to avoid account overdraft in the parents' accounts. Further, the parents may be notified when the conditional loan is applied to the child's account.

The system may allow the user 105 to transfer funds from another account to the account that may experience account overdraft. For example, the user 105 may have multiple accounts and may link the accounts such that funds from another account may be transferred to the account to avoid account overdraft. The system may allow the user 105 to link and set up the accounts such that the funds may automatically be transferred among the accounts to avoid account overdraft in any of the accounts. For example, when the system detects that account A of the user 105 is about to have an account overdraft, the system may automatically search through the user 105's other accounts and find account B that has adequate funds to transfer funds to account A to avoid account overdraft in account A. The system may automatically select an account from among the user 105's accounts based on the other accounts fund availability, projected fund usage, fund transfer fees, and/or fund transfer speed. An account with adequate funds with low transfer fee and fast transfer speed may be selected.

The system may allow the user 105 to change funding sources for making payments to avoid account overdraft. For example, the user 105 may have a payment account with the payment service provider. The payment account of the user 105 may designate multiple funding sources, such as bank accounts, credit card accounts, debit card accounts, or the like for making payments via the payment account. When the system determines that one of the funding sources may experience account overdraft, the system may allow the user 105 to select another funding source for making payments to avoid account overdraft. In an example, when a primary funding source may have a potential account overdraft, the system may automatically switch to a secondary funding source for making payments. In this case, the user 105 may be notified and the system may provide the user 105 with an option to confirm the switch or select other options for avoiding account overdraft.

The system may allow the user 105 to make mobile deposits into the account to avoid account overdraft. For example, the mobile app on the user device 110 may allow the user 105 to use a camera included with the user device 110 to take a picture of a physical payment instrument, such as a check, a money order, paper money, or the like, to make an instant deposit into the account to avoid account overdraft. The image of the physical payment instrument may be communicated to a server of the financial institution where the account is held and the server of the financial institution may extract fund transfer information from the image of the physical payment instrument, such as payer's bank routing number, account number, payment amount, payer's name, contact information, and the like. The financial institution may analyze the information and may generate a payment request to the payer's institution to retrieve payment. In some embodiments, the financial institution of the user 105 may credit the user 105's account with the amount of payment before the actual payment is received from the payer's account. Thus, the user 105's account may be immediately funded to avoid account overdraft.

The system may allow the user 105 to restrict withdrawals or spending for a particular location and/or for a particular time period. For example, the system may allow the user 105 to restrict spending from the account to a certain amount, e.g., zero or less than a predetermined amount, until the account is replenished with enough funds to avoid account overdraft. The system may automatically restrict spending and may notify the user 105 of the restriction and conditions of the restriction (which may be set by the user or the system), such as below a certain spending amount or for a certain period of time.

In an embodiment, when the potential account overdraft is triggered by a location of the user 105, the system may allow the user 105 to restrict withdrawals or location. For example, the system may detect that the user 105 is visiting a shopping location where the user 105 historically averaged spending is about $200 each visit and the user 105's account currently has an account balance of $80. The system may alert the user 105 of the potential account overdraft based on the user 105's current location at the shopping location. The system may provide the user 105 the option to restrict spending at the shopping location, such that the user 105 may not use the account when the user 105 is at the shopping location or the user 105 is restricted to spend less than $80 when the user 105 is at the shopping location. Thus, the user 105 may avoid account overdraft based on the user 105's location. Alternatively, the system may remove or revise the restrictions if the user take actions to prevent the overdraft, such as rescheduling a later payment, canceling a recurring payment, or other actions as described herein. In some embodiments, one or more account overdraft prevention options may be pre-selected by the user 105 or by default. The system may automatically execute the pre-selected account overdraft options when an account overdraft is detected.

One or more of the above options may be presented to the user 105 and the user 105 may select one or more options to avoid account overdraft. For example, two or more options may be used together to avoid the account overdraft depending on how much funds are needed to avoid the overdraft. The above processes 200 and 300 may be executed by payment provider server 170. In some embodiments, the processes 200 and 300 may be executed at the user device 110 or by the user device 110 in coordination with the payment provider server 170. In some other embodiments, one or more steps of the above processes 200 and 300 may be executed by servers of financial institutions where the user 105's account is held, such as bank servers or merchant servers.

Figure 4:
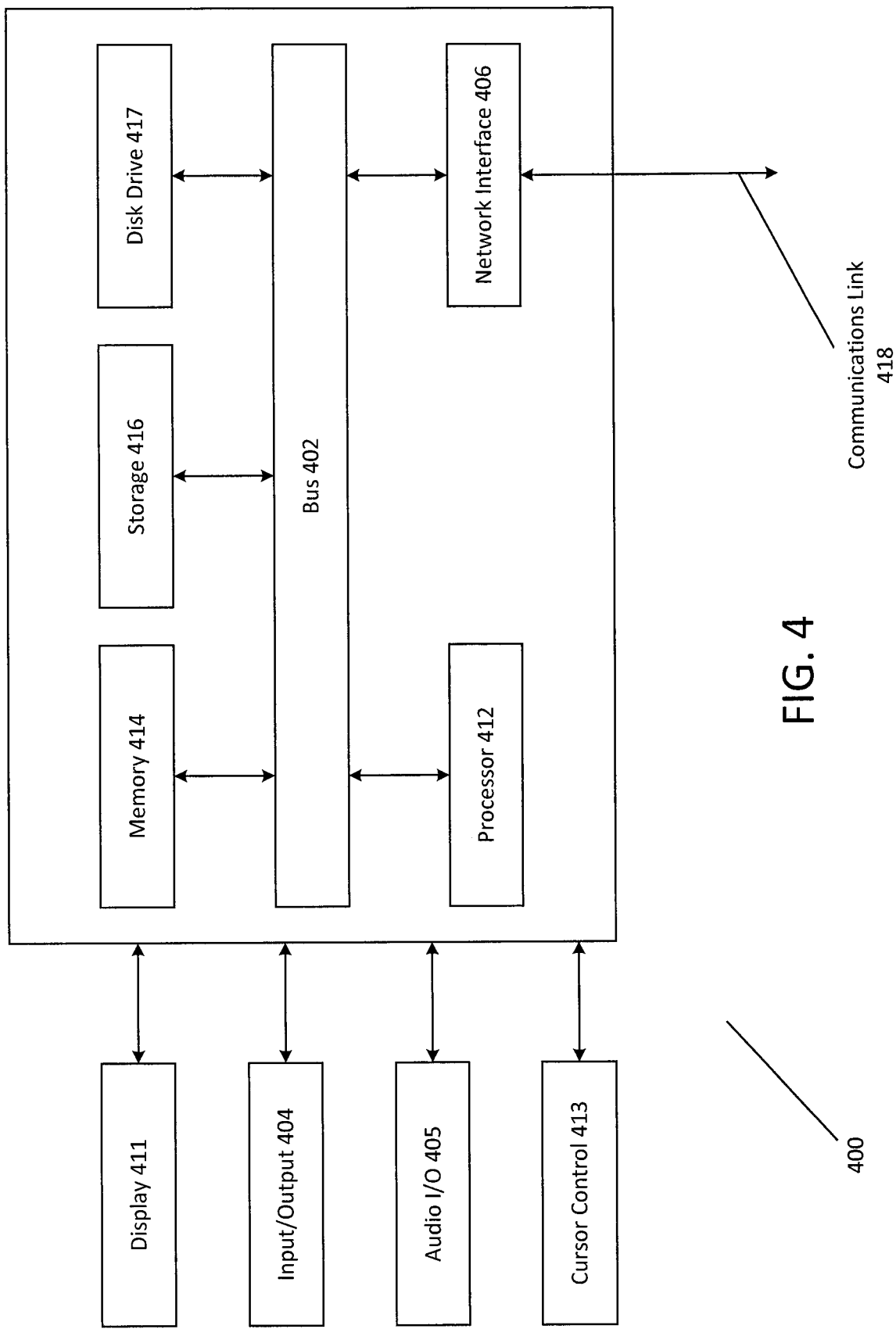
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 160. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device, comprising:
   a processor;
   a display unit;
   a wireless communications hardware unit; and
   a non-transitory computer-readable medium having stored thereon instructions that are executable to cause the user device to perform operations comprising:
   determining, at the user device, location data generated from the wireless communications hardware unit of the user device, wherein the wireless communications hardware unit includes at least one of a global positioning system (GPS) receiver or a wireless data network transmitter;
   transmitting the location data to a server system for a determination whether a potential account overdraft exists for an account of a user of the user device;
   receiving, from the server system, a notification of the potential account overdraft, wherein the notification includes one or more electronically selectable options intended to prevent the potential account overdraft;
   displaying, on the display unit, the one or more electronically selectable options intended to prevent the potential account overdraft; and
   receiving, from the user, a selection of a particular one of the one or more electronically selectable options intended to prevent the potential account overdraft.

2. The user device of claim 1, wherein the one or more wireless communications hardware units include a Bluetooth device.

3. The user device of claim 1, wherein the one or more electronically selectable options are displayed on the user device based on receiving, from the server system, the notification to the user device along with information indicating that the notification is to be handled at the user device by a particular application installed on the user device, wherein the one or more electronically selectable options are displayed on the user device using the particular application.

4. The user device of claim 1, wherein the one or more electronically selectable options in the notification are based on user-specific data for the user at the server system.

5. The user device of claim 4, wherein the user-specific data includes one or more of creditworthiness, an expectation of future income, an expectation of future loss or decreased income, or an amount already owed on one or more other accounts.

6. The user device of claim 1, wherein the one or more electronically selectable options include at least one of: modifying an upcoming payment; changing a funding source; or transferring funds from another account.

7. The user device of claim 1, wherein the one or more electronically selectable options include at least one of:
   cancelling a pending transaction made via the user device;
   modifying an amount of the pending transaction; or
   modifying withdrawal data for the pending transaction.

8. A method, comprising:
   determining, at a user device, location data generated from a wireless communications hardware unit of the user device, wherein the wireless communications hardware unit includes at least one of a global positioning system (GPS) receiver or a wireless data network transmitter;
   transmitting the location data from the user device to a server system for a determination whether a potential account overdraft exists for an account of a user of the user device;
   receiving, at the user device from the server system, a notification of the potential account overdraft, wherein the notification includes one or more electronically selectable options intended to prevent the potential account overdraft;
   displaying, on a display unit of the user device, the one or more electronically selectable options intended to prevent the potential account overdraft; and
   receiving, at the user device from the user, a selection of a particular one of the one or more electronically selectable options intended to prevent the potential account overdraft.

9. The method of claim 8, wherein transmitting the location data from the user device to a server system is based on detecting a potential purchase transaction by the user device.

10. The method of claim 9, wherein detecting the potential purchase is based on the user device being in a particular location at which the user has made a previous purchase transaction.

11. The method of claim 8, wherein detecting the potential purchase is based on the user device being in a particular location corresponding to a merchant entity with whom the user has made a previous purchase transaction.

12. The method of claim 8, wherein the notification of the potential account overdraft is based on the server system determining that the potential account overdraft exists due to historical purchasing data specific to the account of the user.

13. The method of claim 8, wherein the notification of the potential account overdraft is based on the server system determining that the potential account overdraft exists due to historical purchasing data specific to a plurality of user accounts.

14. The method of claim 13, wherein the plurality of user accounts do not include the account of the user.

15. A non-transitory computer-readable medium having stored thereon instructions executable by a user device to cause the user device to perform operations comprising:
   determining location data generated from a wireless communications hardware unit of the user device, wherein the wireless communications hardware unit includes at least one of a global positioning system (GPS) receiver or a wireless data network transmitter;

transmitting the location data to a server system for a determination whether a potential account overdraft exists for an account of a user of the user device;

receiving, from the server system, a notification of the potential account overdraft, wherein the notification includes one or more electronically selectable options intended to prevent the potential account overdraft;

displaying, on a display unit of the user device, the one or more electronically selectable options intended to prevent the potential account overdraft; and receiving, from the user, a selection of a particular one of the one or more electronically selectable options intended to prevent the potential account overdraft.

16. The non-transitory computer-readable medium of claim 15, wherein the operations further comprise:

transmitting the location data responsive to the user opening a particular application on the user device.

17. The non-transitory computer-readable medium of claim 16, wherein the particular application includes an ability to initiate electronic purchase transactions, and wherein the transmitting the location data is performed in response to an indication that the user has initiated an electronic purchase transaction.

18. The non-transitory computer-readable medium of claim 15, wherein displaying the one or more electronically selectable options includes at least one of displaying a visual notification, playing an audio sound to indicate, or vibrating the user device.

19. The non-transitory computer-readable medium of claim 15, wherein the operations further comprise:

transmitting, to the server system, payment information about one or more upcoming payments required for the user, wherein determining that the potential account overdraft exists is based on the payment information.

20. The non-transitory computer-readable medium of claim 15, wherein the one or more electronically selectable options intended to prevent the potential account overdraft include an option to change a funding source for an electronic purchase transaction associated with the potential account overdraft.

* * * * *